United States Patent Office 3,751,476
Patented Aug. 7, 1973

3,751,476
BIS(2-FLUORO-2,2-DINITROETHYL) NITROSAMINE
Horst G. Adolph, Beltsville, and Mortimer J. Kamlet, Silver Spring, Md., assignors to the United States of America as represented by the Secretary of the Navy
No Drawing. Filed Jan. 29, 1970, Ser. No. 12,521
Int. Cl. C07c 111/00
U.S. Cl. 260—583 CC    1 Claim

ABSTRACT OF THE DISCLOSURE

Bis(2-fluoro-2,2-dinitroethyl)nitrosamine is prepared by reacting bis(2-fluoro-2,2-dinitroethyl)amine with nitrosylsulfuric acid or any similar nitrosating agent. This compound is used as a plasticizer and an explosive.

BACKGROUND OF THE INVENTION

This invention generally relates to amines and more particularly to bis(2-fluoro-2,2-dinitroethyl)nitrosamine and methods of preparation thereof for explosive applications.

It has long been known that nitro group containing compounds are explosives. More recently, aliphatic nitro compounds have found use as plasticizers for explosive compositions. Since one usually wants explosive compositions to deliver as much energy per gram as is possible it is important that every component of the composition contribute to the explosive energy release upon detonation. Thus, it is important to find plasticizers which are not only capable of acting as plasticizers but which additionally are good explosives.

To act as an explosive-plasticizer a compound should have (1) a high heat of detonation so that it will release a substantial amount of energy upon detonation, (2) a low melting point so that it will not crystallize out of the composition and (3) good thermal stability so that it will not detonate or decompose when exposed to moderately high temperatures.

There have been many past attempts to produce compounds which possess all of the above characteristics (see for example, U.S. Pat. 2,985,683 to Klager who prepares bis(2-bromo-2,2-dinitroethyl)nitrosamine) but heretofore all known plasticizer-explosives had left something to be desired.

SUMMARY OF THE INVENTION

Accordingly, one object of this invention is to provide a new chemical compound.

Another object of the instant invention is to provide an explosive-plasticizer characterized by a high thermal stability, a relatively low melting point and a high heat of detonation.

A further object of the present invention is to provide a chemical compound which can be used as an explosive-plasticizer.

Still another object of this invention is to provide methods for preparing the chemical compound of this invention.

These and other objects of the invention are accomplished by providing bis(2-fluoro-2,2-dinitroethyl)nitrosamine which can be prepared by reacting bis(2-fluoro-2,2-dinitroethyl)amine with a nitrosating agent such as nitrosylsulfuric acid.

DESCRIPTION OF THE PREFERRED EMBODIMENT

Bis(2-fluoro-2,2-dinitroethyl)nitrosamine can be prepared by reacting bis(2-fluoro-2,2-dinitroethyl)amine, whose preparation is described in copending application Ser. No. 849,277, with any common nitrosating agent under typical reaction conditions.

The bis(2-fluoro-2,2-dinitroethyl)nitrosamine of this invention differs substantially from the closely related bis(2-bromo-2,2-dinitroethyl)nitrosamine of the prior art. Thus, the fluoro compound has a melting point of 48–9° C. while the bromo counterpart has a melting point of 118° C. As was hereinbefore noted, a lower melting point is desired so that the compound will not crystallize out of a composition containing it.

Furthermore, the heat of detonation of the fluoro compound is 1484 cal./g. (using $H_2O$—$CO$—$CO_2$ arbitrary standard) as opposed to a heat of detonation of 943 cal./g. for the bromo compound. In fact, the heat of detonation of the bromo compound is so low that it is only slightly above what can be considered an explosive.

Perhaps the most starting difference between the fluoro and bromo compounds is the difference in thermal stability. Thus, the fluoro compound when heated in vacuum at 125° C. for 29 hours evolves only 30.6 cc. of gas per gram while the bromo compound evolved 30 cc. of gas per gram in only 27 minutes under the same conditions.

The general nature of the invention having been set forth, the following example is presented as a specific illustration thereof. It will be understood that the invention is not limited to these specific examples but is susceptible to various modifications that will be recognized by one of ordinary skill in the art.

EXAMPLE

Bis(2-fluoro-2,2-dinitroethyl) amine (13 g.) was added gradually to a solution of 3.9 g. sodium nitrite in 100 ml. conc. sulfuric acid while the temperature of the mixture was maintained ambient. After stirring two additional hours, the mixture was poured over crushed ice, the solid was filtered off and recrystallized from methyl chloride/pentane. About 13 g. (91%) of bis(2-fluoro-2,2-dinitroethyl)nitrosamine, M.P. 48–9° C., was obtained.

Obviously, numerous modifications and variations of the present invention are possible in the light of the above teachings. It is therefore to be understood that within the scope of the appended claim the invention may be practiced otherwise than as specifically described herein.

What is claimed as new and desired to be secured by Letters Patent of the United States is:

1.

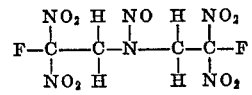

References Cited
UNITED STATES PATENTS
3,340,303   9/1967   Roberts _____ 260—583 CC OTHER REFERENCES
Grimes et al., Chem. Soc. Journal, London, 1964.

LELAND A. SEBASTIAN, Primary Examiner

U.S. Cl. X.R.
149—92